(12) United States Patent
Wang et al.

(10) Patent No.: US 11,113,878 B2
(45) Date of Patent: Sep. 7, 2021

(54) SCREEN TILE PAIR-BASED BINOCULAR RENDERING PIPELINE PROCESS AND METHOD

(71) Applicant: ZHEJIANG UNIVERSITY, Hangzhou (CN)

(72) Inventors: Rui Wang, Hangzhou (CN); Hujun Bao, Hangzhou (CN); Yazhen Yuan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 16/622,212

(22) PCT Filed: Jan. 2, 2018

(86) PCT No.: PCT/CN2018/070034
§ 371 (c)(1),
(2) Date: Dec. 12, 2019

(87) PCT Pub. No.: WO2018/227950
PCT Pub. Date: Dec. 20, 2018

(65) Prior Publication Data
US 2020/0193704 A1    Jun. 18, 2020

(30) Foreign Application Priority Data
Jun. 16, 2017    (CN) .......................... 201710461595.4

(51) Int. Cl.
*G06T 17/10*    (2006.01)
*G06T 7/174*    (2017.01)
(Continued)

(52) U.S. Cl.
CPC ................ *G06T 17/10* (2013.01); *G06T 1/20* (2013.01); *G06T 7/174* (2017.01); *G06T 7/70* (2017.01);
(Continued)

(58) Field of Classification Search
None
See application file for complete search history.

(56) References Cited

U.S. PATENT DOCUMENTS

| 9,183,607 B1 * | 11/2015 | Mahan ................. G06T 15/005 |
| 2014/0267259 A1 * | 9/2014 | Frascati ................ G06T 15/005 345/423 |

(Continued)

FOREIGN PATENT DOCUMENTS

| CN | 101635061 | 1/2010 |
| CN | 102663801 | 9/2012 |
| CN | 105224288 | 1/2016 |

*Primary Examiner* — YuJang Tswei
(74) *Attorney, Agent, or Firm* — Jiwen Chen; Jacobson Holman PLLC (57) ABSTRACT

The invention discloses A screen tile-pair based binocular rendering pipeline process and method, comprising: completing space division according to a spatial relationship of two visual angles in stereo rendering, and generating input primitive lists corresponding to the divided space; searching non-full primitive lists of space divisions and obtaining a surface with spatial partition; and dispatching all generated spatial divisions, and simultaneously performing rasterizing and rendering of two visual angles for primitives in each space division. According to the new measures, a spatial correlation of two visual angles in stereo rendering is considered, and in a rendering process the two visual angles are rasterized and rendered at the same time, thereby reducing a bandwidth required for repeated reading of triangular data in the rendering process.

9 Claims, 3 Drawing Sheets

(51) Int. Cl.
*G06T 7/70* (2017.01)
*G06T 1/20* (2006.01)
*G06T 15/00* (2011.01)
*H04N 13/275* (2018.01)

(52) U.S. Cl.
CPC .. *G06T 15/005* (2013.01); *G06T 2207/20021* (2013.01); *H04N 13/275* (2018.05)

(56) References Cited

U.S. PATENT DOCUMENTS

2016/0260241 A1   9/2016  Jin
2017/0103567 A1*  4/2017  Peterson .................. G06T 15/80
2017/0124748 A1*  5/2017  Ellis ..................... H04N 13/351

* cited by examiner

SCREEN TILE PAIR-BASED BINOCULAR RENDERING PIPELINE PROCESS AND METHOD

This is a U.S. national stage application of PCT Application No. PCT/CN2018/070034 under 35 U.S.C. 371, filed Jan. 2, 2018 in Chinese, claiming priority of Chinese Application No. 201710461595.4, filed Jun. 16, 2017, all of which is hereby incorporated by reference.

TECHNICAL FIELD

The present invention relates to the technical field of real-time rendering, in particular to a screen tile-pair based binocular rendering pipeline process and method.

BACKGROUND TECHNOLOGY

Stereoscopic rendering represents the rendering of two images with parallax only in the X-axis direction, which is a special case of multi-view rendering. Simple multi-view rendering can be achieved through multiple independent rendering processes. However, multiple independent rendering processes involve multiple calls to the graphics application interface, resulting in inefficient rendering. Therefore, one of the key optimizations for multi-view rendering is to break through the limitations of such multiple calls.

De Sorbier uses a vertex and geometry shader to simultaneously project geometry to two different viewpoints in a same rendering process. NVIDIA's Single Pass Stereo implements a new multi-projection architecture on the Pascal-based graphics card that projects both geometries into the left and right views by rendering only one pass. However, this technology only outputs the position coordinates of the two viewpoints at the same time in the vertex shader stage, and does not consider the geometric relationship between the two views.

In addition, some methods based on epipolar geometry have also been used to optimize the rasterization process under two pilots. Adelson used projection correspondence to analyze and optimize a series of classical graphics algorithms under two pilots, including scan line rasterization, culling, and hidden surface culling. Hasselgren proposed to rasterize and calculate the coloring at multiple viewpoints along the barycentric coordinates of the triangle on the scan line. In the process of traversing the scan lines, the coloring calculation can be reduced by multiplexing the coloring results of adjacent viewpoints.

In the field of graphics rendering, the screen tile-pair-based rendering techniques have been developed for a long time. A large number of screen tile-pair based technologies have been implemented by Fuchs et al. in the Pixel Planes 5 project. However, because the screen tile-pair based technologies need to sort the geometric data in the middle of the rendering pipeline, the technologies has not been widely applied to desktop graphics cards, but is widely used in embedded graphics cards such as ARM and POWERVR. The multi-view rasterization framework proposed by Hasselgren also considers the case based on rendering, but they only consider the case inside a triangle without considering the distribution of the entire scene.

SUMMARY OF THE INVENTION

In view of the deficiencies of the prior art, the present invention proposes a stereo hardware rendering pipeline method based on splicing pairs, which considers the correlation of scene geometry in two, namely left and right, perspectives. At the same time, the rasterization of geometric primitives in two perspectives is accomplished simultaneously, and the stereo hardware rendering pipeline method based on splicing pairs can effectively reduce the bandwidth required to render the scene.

The technical solution of the present invention is:

A screen tile-pair based binocular rendering pipeline process and method, comprising the following steps:

(1) dividing an entire space into a plurality of screen tile pairs according to the spatial relationship of left and right visual angles in binocular rendering, and generating a primitive list in the input scene corresponding thereto for each screen tile pair;

(2) after generating the screen tile pairs, obtaining a plurality of spatially consistent surfaces by searching the screen tile pairs, wherein the spatially consistent surface is a surface formed by spaces corresponding to a plurality of connected screen tile pairs to the;

(3) after obtaining a plurality of spatial consistency surfaces, scheduling all the screen tile pairs, and rasterizing and rendering the primitives corresponding to each screen tile pair simultaneously.

In the present invention, any screen tile corresponding to the screen of the left view corresponding to the screen and any screen tile corresponding to the screen of the right view form a screen tile pair, according to the left and right view lines and the two screen tiles constituting the screen tile pair, behind the two screen tiles. The area formed by the intersection of the left and right lines of sight is referred to as the corresponding space of the screen tile pair.

The specific steps of Step (1) are as follows:

(1-1) According to a present screen tile size n×n, dividing the screens corresponding to left and right visual angles respectively into a plurality of screen tiles $T_j^0$ and $T_j^1$; wherein, j=1,2, . . . , N represents the serial number of the screen tiles, and the serial number j is incremented from left to right, from top to small, and N is the total number of the screen tiles;

(1-2) Respectively calculating positions $L_{P_i}^0$ and $L_{P_i}^1$ of a input i-th primitive $P_i$ projected on the screens corresponding to left and right visual angles, where i=1, 2, M, M is the total number of the input primitives;

(1-3) After determining the positions $L_{P_i}^0$ and $L_{P_i}^1$, respectively calculating screen tiles covered by the positions $L_{P_i}^0$ and $L_{P_i}^1$, and the screen tiles form screen tile set $T_{P_i}^0$ and $T_{P_i}^1$ covered by the primitive $P_i$;

(1-4) In a screen tile unit, according to each polar line in the horizontal direction, traversing the screen tiles on the current polar line in the screens corresponding to left and right visual angles from left to right simultaneously, and determining whether the current primitive $P_{cur}$ belongs to the currently traversed screen tile pair ($T_{cur}^0$, $T_{cur}^1$);

(1-5) constructing a double-layer index in the traversing process, the first layer index being a primitive index, which is a primitive list on the space corresponding to the screen tiles; the second layer index is an index of the primitives on the screen tiles, which is an index list of primitives on the screen tiles corresponding to the corresponding space of the screen tile pairs.

In the present invention, the present screen tile size n×n is convenient for parallel processing. Generally, the value is a power of two, and the value range of n is generally $2^3$~$2^7$. The primitive refers to the constituent elements of the mesh model that needs to be drawn, such as a triangle in a triangular mesh.

In Step (1-3), the positions $L_{P_i}^0$ of the primitive $P_i$ projected on the screens corresponding to left visual angles intersects the screen tiles in the screen tile set $T_{Pi}^0$, the screen tile set $T_{Pi}^0$ covered by the primitive $P_i$ is determined; similarly, the positions $L_{P_i}^1$ of the primitive $P_i$ projected on the screens corresponding to right visual angles intersects the screen tiles in the screen tile set $T_{Pi}^1$, the screen tile set $T_{Pi}^1$ covered by the primitive $P_i$ is determined.

In Step (1-4) the specific steps of whether the current primitive $P_{cur}$ belongs to the currently traversed screen tile pair $(T_{cur}^0, T_{cur}^1)$ are as follows:

(a) forming sets of $T_{Pcur}^0$, and $T_{Pcur}^1$ through respectively extracting the screen tiles on the current polar line from overlay screen tile sets $T_{Pcur}^0$ and $T_{Pcur}^1$ of the current primitive $P_{cur}$; and the smallest sequence number screen tiles $T_{j_{min}}^0$ and $T_{j_{min}}^1$ extracted from the sets of $T_{Pcur}^0$, and $T_{Pcur}^1$ are used as the currently traversing screen tiles $T_{cur}^0$, $T_{cur}^1$;

(b) respectively calculating the barycentric coordinates $(s_{cur}^0, e_{cur}^0)$ and $(s_{cur}^1, e_{cur}^1)$ of the screen tiles $T_{cur}^0$ and $T_{cur}^1$ on the boundary of the screen tiles, $s_{cur}^0$ and $e_{cur}^0$ respectively represent the barycentric coordinates calculated at the vertical coordinate $c_v^0$ on the left and right boundary of $T_{cur}^0$; $s_{cur}^1$ and $e_{cur}^1$ respectively represent the barycentric coordinates calculated at the vertical coordinate $c_v^1$ on the left and right boundary of $T_{cur}^1$, and $c_v^1 = c_v^0$;

(c) determining the traversing direction d of the current primitive $P_{cur}$ on the current pole line by calculating the difference between the barycentric coordinates of the screen tile boundary on the same polar line;

(d) Respectively calculating the benefit interval $[E^0(s), E^0(e)]$, $[E^1(s), E^1(e)]$ of the screen tiles $T_{cur}^0$, $T_{cur}^1$, if $[E^0(s), E^0(e)]$ and $[E^1(s), E^1(e)]$ have overlapping parts, then the current primitive $P_{cur}$ belongs to the currently traversed screen tile pair $(T_{cur}^0, T_{cur}^1)$;

Wherein, $E^0(s) = d * s_{cur}^0$, $E^0(e) = d * e_{cur}^0$, $E^1(s) = d * s_{cur}^1$, $E^1(e) = d * e_{cur}^1$;

(e) Comparing the sizes of $E^0(e)$ and $E^1(e)$:

If $E^0(e) < E^1(e)$, then $T_{cur+1}^0$ is treated as $T_{cur}^0$, $T_{cur}^1$ remains unchanged;

If $E^0(e) > E^1(e)$, then $T_{cur+1}^1$ is treated as $T_{cur}^1$, $T_{cur}^0$ remains unchanged;

If $E^0(e) = E^1(e)$, then $T_{cur+1}^0$ is treated as $T_{cur}^0$, $T_{cur+1}^1$ is treated as $T_{cur}^1$;

(f) After performing Step (e), determining whether the screen tile $T_{cur}^0$ exists in the screen tile set $T_{Pcur}^0$ and the screen tile $T_{cur}^1$ exists in the screen tile set $T_{Pcur}^1$. If so, Step (b)~Step (f) are performed circularly, and if not, the traversal search for the current primitive $P_{cur}$ is ended.

In Step (1-5), the method of constructing the primitive list on the space corresponding to the screen tile is consistent with the conventional screen tile-based method. On the basis of the establishment of the primitive index, the screen tile index is established, and the Id of the two screen tiles constituting the screen tile pair is stored on the screen tile pair, and the corresponding primitive is found according to the Id stored in the two screen tiles. That is, the list of T stored on the screen tile pair is the index of primitive list of one primitive on the two screen tiles. For example, the primitive P is the $Id_0$ element $P_0$ in the primitive list of the screen tile $T_b^1$, and the primitive list in the screen tile $T_b^1$ is Id1 element $P_1$, then if the primitive P is stored on the screen tile pair $(T_a^0, T_b^0)$, that the primitive P stored on the screen tile pair $(T_a^0, T_b^0)$ is $(Id_0, Id_1)$.

In Step (2), a plurality of spatially consistent surfaces obtained by searching the screen tile pairs are based on the screen tiles, the following steps are performed for each polar line in the horizontal direction:

(2-1) Among the screen tile pairs generated on the current polar line, using a screen tile pair that is not accessed as an starting screen tile pair $(T_s^0, T_s^1)$ to perform a traversing operation;

(2-2) In the traversing operation, traversing neighboring screen tile pairs that have not been accessed in a depth-first manner;

(2-3) If all connected screen tile pairs have been accessed, the starting screen tile pair $(T_s^0, T_s^1)$ is recorded, and a spatially consistent surface is formed by all connected screen tile pairs;

(2-4) Skipping to perform Steps (2-1)~(2-3) until all the screen tile pairs have been accessed on the current polar line;

By traversing all the screen tile pairs on all the polar lines of the screen through Steps (2-1)~(2-4), a plurality of spatial consistency surfaces are formed, and the starting screen tile pair $(T_s^0, T_s^1)$ in each spatial consistency surface is recorded, which constitutes a starting screen tile pair set, the starting screen tile pair set includes a plurality of starting screen tile pair subsets divided by polar lines, and each starting screen tile pair subset includes all starting screen tile pairs belonging to the same polar line.

In Step (2-1), in the screen tile pairs that are not accessed on the current polar line, the screen tile pair with the smallest screen tile number corresponding to the left visual angle is used as the starting screen tile pair $(T_s^0, T_s^1)$, if there are multiple screen tile pairs with the smallest screen tile number corresponding to the left visual angle, then the screen tile pair with the smallest screen tile number corresponding to the left and right visual angles are used as the starting screen tile pair $(T_s^0, T_s^1)$.

In Step (2-2), for the screen tile pair $(T_s^0, T_s^1)$, the neighboring screen tile pairs that have not been accessed are traversed in a depth-first manner according to the screen tile pair $(T_{s+1}^0, T_s^1)$, the screen tile pair $(T_{s+1}^0, T_{s+1}^1)$, the screen tile pair $(T_s^0, T_{s+1}^1)$.

In Step (3), the following steps are performed for each polar line in the horizontal direction:

(3-1) Among the screen tile pair subset corresponding to the current polar line, starting with the appropriate starting screen tile pair, according to the depth-first manner, all the unrasterized screen tile pairs in the spatially consistent surface corresponding to the starting screen tile pair are traversed;

(3-2) During the traversing process, the primitives in the screen tile pairs being accessed are rasterized and drawn;

(3-3) Skipping to perform Steps (3-1)~(3-3) until all the starting screen tile pairs in the starting screen tile pair subsets corresponding to the current polar line are accessed;

All the screen tile pairs are rasterized and drawn according to Steps (3-1)~(3-3).

In Step (3-1), the appropriate starting screen tile pair is determined in the following manner: in the screen tile pair subsets, the starting screen tile pair with the maximum screen tile number corresponding to the right visual angle is used as the appropriate starting screen tile pair; if there are multiple screen tile pairs with the maximum screen tile number corresponding to the right visual angle, then the screen tiles pair with the maximum screen tile number corresponding to the right and left visual angles are used as the appropriate starting screen tile pair.

In Step (3-1), the depth-first manner is consistent with the depth-first manner of Step (2-2).

In Step (3-2), the specific process of rasterizing and rendering the primitives in the screen tile pairs being accessed:

(3-2-1) For the current screen tile pair being accessed, two primitive indexes that need to be drawn are read according to the two-layer index; specifically: determining whether the two primitive indexes corresponding to the screen tile pairs are negative, and if so, the two primitives have been rasterized on the associated screen tiles, if not, then Step (3-2-2) is performed;

(3-2-2) The rasterization data(screen space position, surface equation) and the corresponding required rendering data(vertex attribute, etc.) are read according to the two primitive indexes, and the two primitives are rasterized and drawn; and after completing the rasterization and rendering, the primitive index is assigned a negative value and written back to the position corresponding to the primitive list on the screen tile.

The present invention simultaneously processes data of two visual angles in the rendering process, and reduces the cost of repeatedly rendering data such as vertex attributes in the conventional screen tile method. In addition, by searching for spatial consistency and scheduling according to the screen tile, it is possible to reduce the excessive coloring by combining optimization means such as level Z culling.

DESCRIPTION OF THE EMBODIMENTS

In order to describe the present invention more specifically, the technical solutions of the present invention will be described in detail below with reference to the accompanying drawings and specific embodiments.

Figure 1:
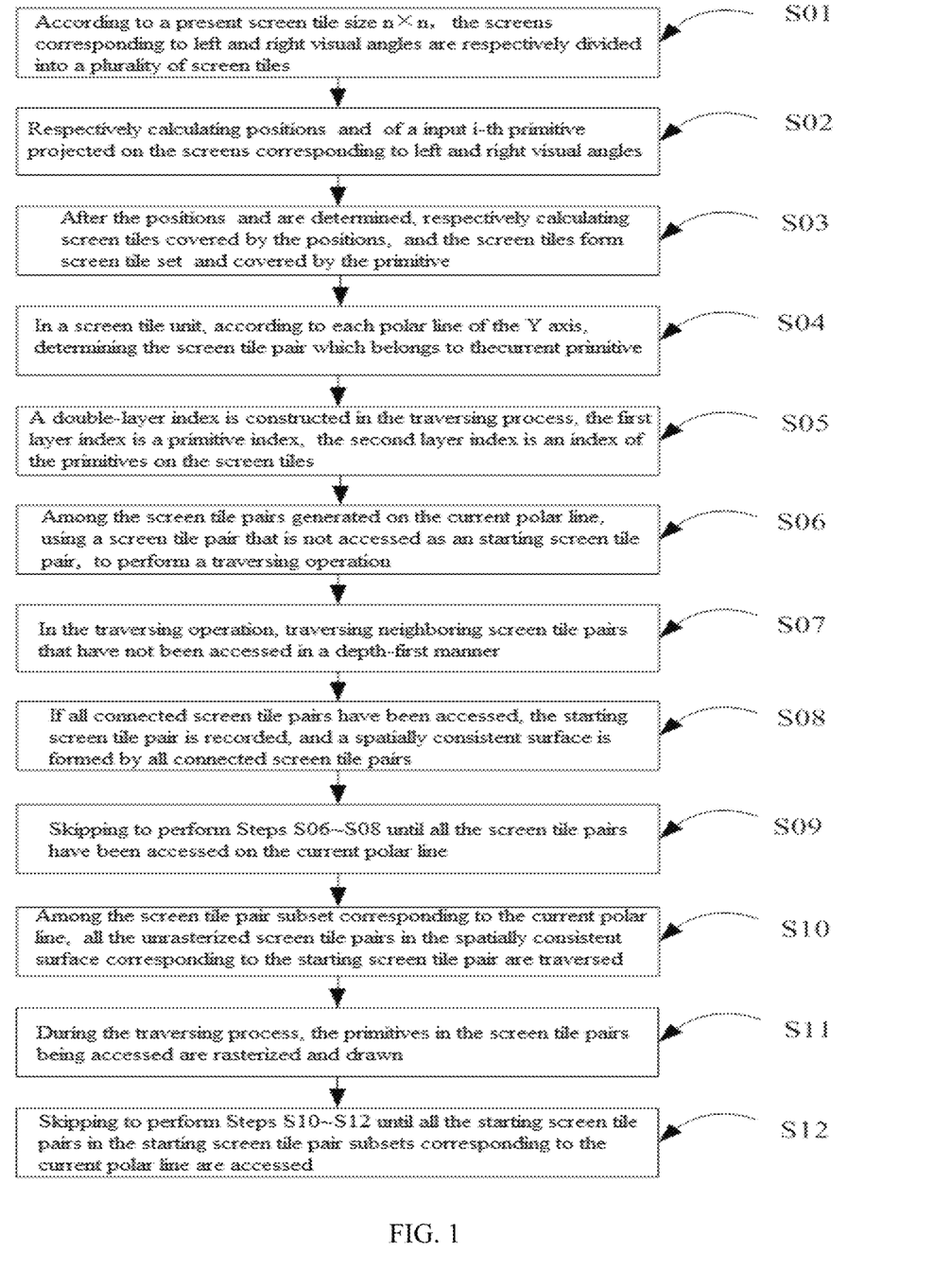
FIG. 1 is a flow diagram of a screen tile-pair based binocular rendering pipeline process and method of the present invention.
Figure 2:
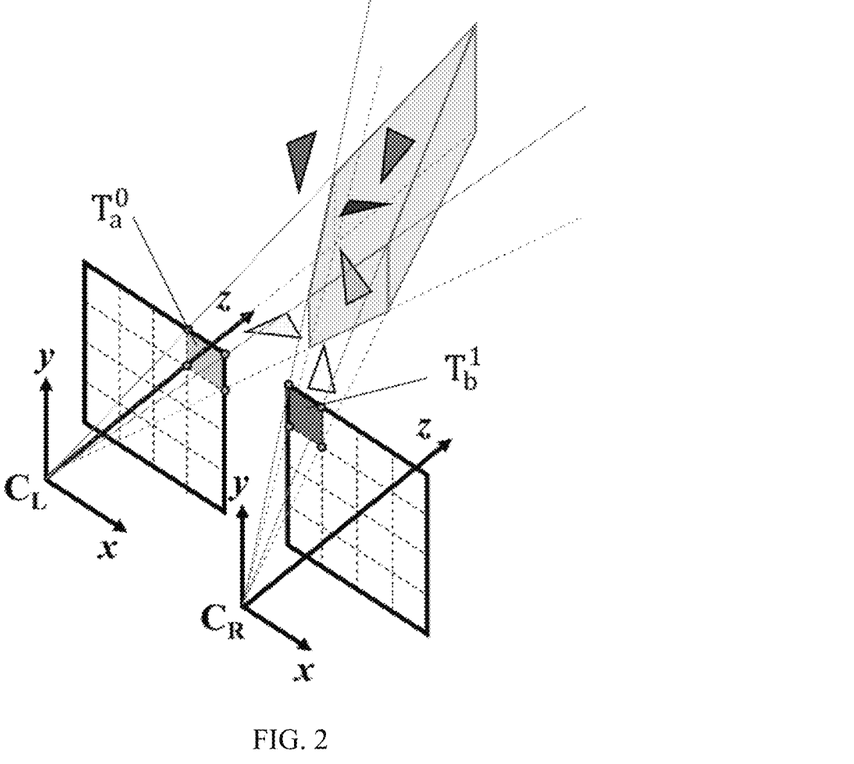
FIG. 2 is a schematic diagram of building a screen tile pair along the polar line of the present invention.

Referring to FIG. 1, a screen tile-pair based binocular rendering pipeline process and method in this Embodiment includes the following steps:

S01, According to a present screen tile size n×n, the screens corresponding to left and right visual angles are respectively divided into a plurality of screen tiles $T_j^0$ and $T_j^1$; wherein, $j=1,2,\ldots,N$ represents the serial number of the screen tiles, and the serial number j is incremented from left to right, from top to small, and N is the total number of the screen tiles, Referring to FIG. 2.

In this Embodiment, n=8, the size of the screens corresponding to left and right visual angles is 640×480, then the serial number of the screens is 0~4799, that is N=4799.

S02, Respectively calculating positions $L_{P_i}^0$ and $L_{P_i}^1$, of a input i-th primitive $P_i$ projected on the screens corresponding to left and right visual angles, where $i=1, 2, M$, M is the total number of the input primitives.

The grid input in this Embodiment is composed of triangular patches, that is, the input primitives are triangles.

S03, After the positions $L_{P_i}^0$ and $L_{P_i}^1$ are determined, respectively calculating screen tiles covered by the positions $L_{P_i}^0$ and $L_{P_i}^1$, and the screen tiles form screen tile set $T_{Pi}^0$ and $T_{Pi}^1$ covered by the primitive $P_i$.

S04, In a screen tile unit, according to each polar line in the horizontal direction, the screen tiles on the current polar line in the screens corresponding to left and right visual angles are traversed from left to right simultaneously, and determining whether the current primitive $P_{cur}$ belongs to the currently traversed screen tile pair $(T_{cur}^0, T_{cur}^1)$.

Figure 3:
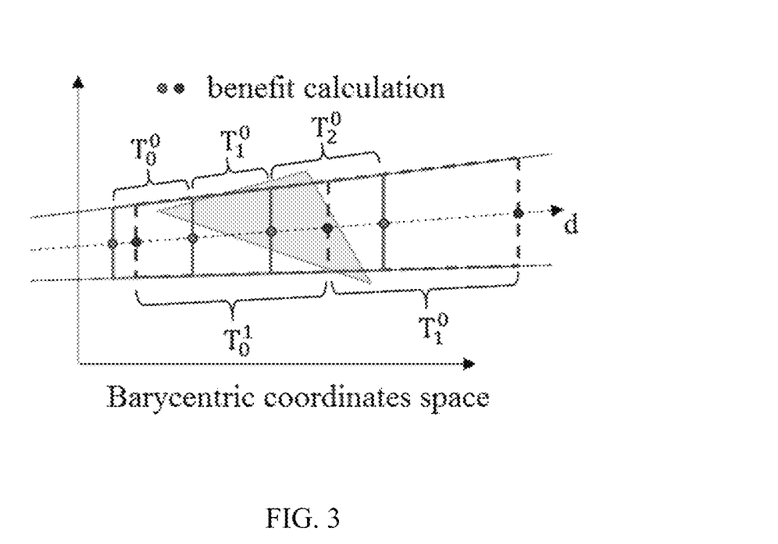
FIG. 3 is a schematic diagram of determine the traversing direction when building screen tile pairs of the present invention.

The specific process of S04 is:

S04-1, Sets of $T_{Pcur}^0$, and $T_{Pcur}^1$ are formed through respectively extracting the screen tiles on the current polar line from overlay screen tile sets $T_{Pcur}^0$ and $T_{Pcur}^1$ of the current primitive $P_{cur}$; and the smallest sequence number screen tiles $T_{j_{min}}^0$ and $T_{j_{min}}^1$ extracted from the sets of $T_{Pcur}^0$, and $T_{Pcur}^1$ are used as the currently traversing screen tiles $T_{cur}^0, T_{cur}^1$;

S04-2, Respectively calculating the barycentric coordinates $(s_{cur}^0, e_{cur}^0)$ and $(s_{cur}^1, e_{cur}^1)$ of the screen tiles $T_{cur}^0$ and $T_{cur}^1$ on the boundary of the screen tiles, $s_{cur}^0$ and $e_{cur}^0$ respectively represent the barycentric coordinates calculated at the vertical coordinate $c_v^0$ on the left and right boundary of $T_{cur}^0$; $s_{cur}^1$ and $e_{cur}^1$ respectively represent the barycentric coordinates calculated at the vertical coordinate $c_v^1$ on the left and right boundary of $T_{cur}^1$, and $c_v^1 = c_v^0$;

S04-3, The traversing direction d of the current primitive $P_{cur}$ on the current pole line is determined by calculating the difference between the barycentric coordinates of the screen tile boundary on the same polar line;

S04-4, Respectively calculating the benefit interval $[E^0(s), E^0(e)], [E^1(s), E^1(e)]$ of the screen tiles $T_{cur}^0, T_{cur}^1$, if $[E^0(s), E^0(e)]$ and $[E^1(s), E^1(e)]$ have overlapping parts, then the current primitive $P_{cur}$ belongs to the currently traversed screen tile pair $(T_{cur}^0, T_{cur}^1)$;

Wherein, $E^0(s)=d*s_{cur}^0, E^0(e)=d*e_{cur}^0, E^1(s)=d*s_{cur}^1, E^1(e)=d*e_{cur}^1$;

S04-5, Comparing the sizes of $E^0(e)$ and $E^1(e)$:

If $E^0(e)<E^1(e)$, then $T_{cur+1}^0$ is treated as $T_{cur}^0, T_{cur}^1$ remains unchanged;

If $E^0(e)>E^1(e)$, then $T_{cur+1}^1$ is treated as $T_{cur}^1, T_{cur}^0$ remains unchanged;

If $E^0(e)=E^1(e)$, then $T_{cur+1}$ is treated as $T_{cur}^0, T_{cur+1}$ is treated as $T_{cur}^1$;

S04-6, After performing Step (e), determining whether the screen tile $T_{cur}^0$ exists in the screen tile set $T_{Pcur}^0$ and the screen tile $T_{cur}^1$ exists in the screen tile set $T_{Pcur}^1$. If so, Step (b)~Step (f) are performed circularly, and if not, the traversal search for the current primitive $P_{cur}$ is ended.

In this Embodiment, first, the first polar line in the horizontal direction is calculated in units of screen tiles, that is, the pixel coordinates of the Y-axis are 0-7, the serial number of the screen tiles corresponding to the left and right visual angles is 0~59. Then, the selected current primitive is the first triangle $P_1$. When traversing the search for the screen block pair, the selected current traversing screen block is $T_{10}^0, T_0^1$. Next, according to the pixel point (80, 4) and the pixel point (88, 4), the barycentric coordinates $(S_{10}^0, e_{10}^0)$ of the screen tile $T_{10}^0$ on the boundary of the screen tile are calculated as ((0.3, 0.6), (0.6,0.6)); similarly, according to the pixel point (0, 4) and the pixel point (8, 4), the barycentric coordinates $(S_0^1, e_0^1)$ of the screen tile $T_{10}^0$ on the boundary of the screen tile are calculated as ((0.2, 0.6), (0.56,0.6)). Further, the traversal direction d is determined according to $e_{10}^0 - S_{10}^0$. Finally, the calculated benefit interval $[E^0(s), E^0(e)]$ and $[E^1(s), E^1(e)]$ have overlapping parts, so the triangle $P_1$ belongs to the screen tile pair $(T_{10}^0, T_0^1)$.

After the search is completed, and comparing $E^0(e) > E^1(e)$, the screen tiles $T_{10}^0$ and $T_0^1$ are taken as the current screen tile, and the next search is performed.

Figure 4:
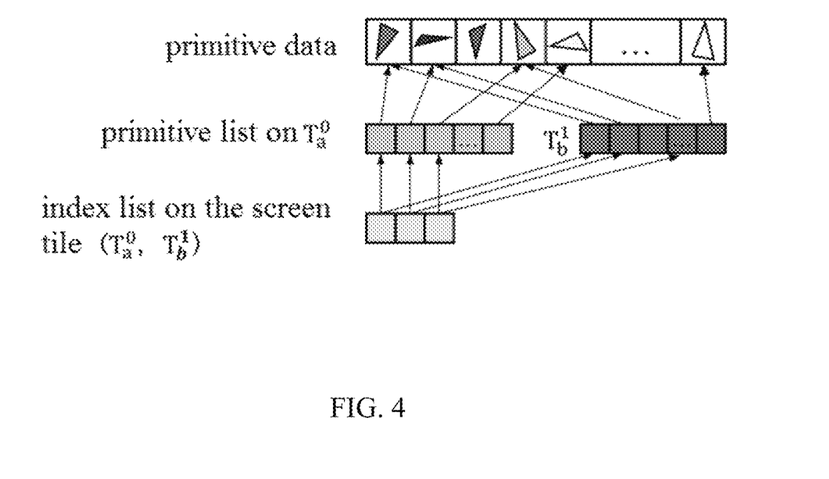
FIG. 4 is a schematic diagram of a two-layer index created during the process of building a screen tile pair of the present invention.

S05, A double-layer index is constructed in the traversing process, the first layer index is a primitive index, which is a primitive list on the space corresponding to the screen tiles; the second layer index is an index of the primitives on the screen tiles, which is an index list of primitives on the screen tiles corresponding to the corresponding space of the screen tile pairs.

In this Embodiment, the triangle $P_1$ is taken as an example in the screen tile pair $(T_{10}^0, T_0^1)$. Since the triangle $P_1$ is visible in the screen tiles $T_{10}^0$ and $T_0^1$, then the serial numbers of the triangles respectively appear in the list of primitives on the screen tiles $T_{10}^0$ and $T_0^1$. Since the primitive list of the screen tile $T_{10}^0$ has been inserted with the triangle $P_0$, the triangle $P_1$ is inserted at the position where the primitive index is 1. In the primitive list of the screen tile $T_0^1$, the triangle $P_1$ is inserted at the position where the primitive index is 0, therefore, the last new element of the generated screen tile pair $(T_{10}^0, T_0^1)$ is (1, 0).

Figure 5:
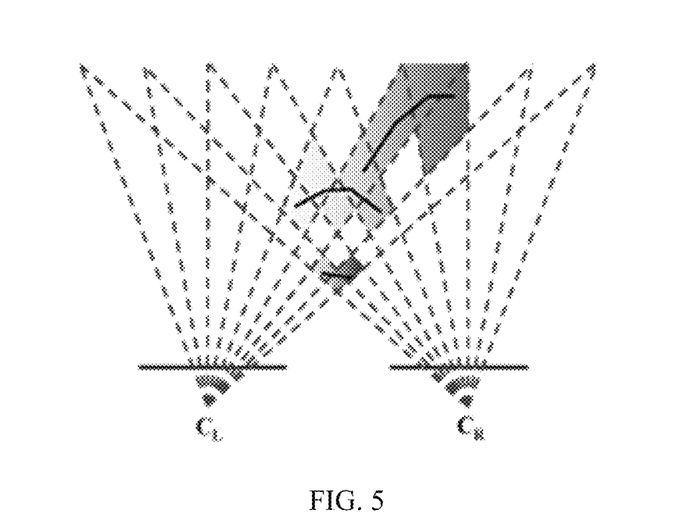
FIG. 5 is a schematic diagram of a partially consistent surface formed in the present invention.

S06, Among the screen tile pairs generated on the current polar line, using a screen tile pair that is not accessed as an starting screen tile pair $(T_s^0, T_s^1)$ to perform a traversing operation;

In Step S06, in the screen tile pairs that are not accessed on the current polar line, the screen tile pair with the smallest screen tile number corresponding to the left visual angle is used as the starting screen tile pair $(T_s^0, T_s^1)$, if there are multiple screen tile pairs with the smallest screen tile number corresponding to the left visual angle, then the screen tile pair with the smallest screen tile number corresponding to the left and right visual angles are used as the starting screen tile pair $(T_s^0, T_s^1)$.

In this Embodiment, according to the above-mentioned selection order, the screen tile pair $(T_{10}^0, T_0^1)$ is selected as the starting screen tile pair.

S07, In the traversing operation, traversing neighboring screen tile pairs that have not been accessed in a depth-first manner.

In Step S07, for the screen tile pair $(T_s^0, T_s^1)$, the neighboring screen tile pairs that have not been accessed are traversed in a depth-first manner according to the screen tile pair $(T_{s+1}^0, T_s^1)$, the screen tile pair $(T_{s+1}^0, T_{s+1}^1)$, the screen tile pair $(T_s^0, T_{s+1}^1)$. In this Embodiment, the screen tile pair $(T_{11}^0, T_0^1)$, the screen tile pair $(T_{11}^0, T_1^1)$, the screen tile pair $(T_{10}^0, T_1^1)$ are traversed in turn according to the depth-first manner.

S08, If all connected screen tile pairs have been accessed, the starting screen tile pair $(T_s^0, T_s^1)$ is recorded, and a spatially consistent surface is formed by all connected screen tile pairs.

S09, Skipping to perform Steps (2-1)~(2-3) until all the screen tile pairs have been accessed on the current polar line In this embodiment, when the next execution of S06 is performed, the screen tile pair $(T_{30}^0, T_{20}^1)$ is taken as a new starting screen tile pair.

By traversing all the screen tile pairs on all the polar lines of the screen through Steps S06~S09, a plurality of spatial consistency surfaces are formed, and the starting screen tile pair $(T_s^0, T_s^1)$ in each spatial consistency surface is recorded, which constitutes a starting screen tile pair set, the starting screen tile pair set includes a plurality of starting screen tile pair subsets divided by polar lines, and each starting screen tile pair subset includes all starting screen tile pairs belonging to the same polar line.

S10, Among the screen tile pair subset corresponding to the current polar line, starting with the appropriate starting screen tile pair, according to the depth-first manner, all the unrasterized screen tile pairs in the spatially consistent surface corresponding to the starting screen tile pair are traversed.

In Step S10, the appropriate starting screen tile pair is determined in the following manner: in the screen tile pair subsets, the starting screen tile pair with the maximum screen tile number corresponding to the right visual angle is used as the appropriate starting screen tile pair; if there are multiple screen tile pairs with the maximum screen tile number corresponding to the right visual angle, then the screen tiles pair with the maximum screen tile number corresponding to the right and left visual angles are used as the appropriate starting screen tile pair. The depth-first manner of Step S10 is consistent with the depth-first manner of Step S07.

In this Embodiment, taking the first polar line in the horizontal direction as an example, the starting screen tile pair subset belonging to the polar line includes a screen tile pair $(T_{10}^0, T_0^1)$, and a screen tile pair $(T_{30}^0, T_{20}^1)$, in this step, starting with the screen tile pair $(T_{30}^0, T_{20}^1)$, and traversing the not accessed screen tile pair according to the depth-first manner.

S11, During the traversing process, the primitives in the screen tile pairs being accessed are rasterized and drawn.

In Step S11, the specific process of rasterizing and rendering the primitives in the screen tile pairs being accessed:

S11-1, For the current screen tile pair being accessed, two primitive indexes that need to be drawn are read according to the two-layer index; specifically: determining whether the two primitive indexes corresponding to the screen tile pairs are negative, and if so, the two primitives have been rasterized on the associated screen tiles, if not, then Step S11-2 is performed.

S11-2, The rasterization data (screen space position, surface equation) and the corresponding required rendering data (vertex attribute, etc.) are read according to the two primitive indexes, and the two primitives are rasterized and drawn; and after completing the rasterization and rendering, the primitive index is assigned a negative value and written back to the position corresponding to the primitive list on the screen tile.

In this Embodiment, taking the screen tile pair $(T_{10}^0, T_0^1)$ as an example, first reading the screen tile list (1,0) on the screen tile pair, then taking the first element in primitive list of $T_{10}^0$ and the 0th element in primitive list of $T_0^1$, and the triangle $P_1$ of the serial number 1 is obtained. Finally, the rasterized data of the triangle $P_1$ at the left and right visual angles is read for rasterization. After the rasterization is completed, −1 is respectively written to the indexed as 1 element in the primitive list of $T_{10}^0$ and the indexed as 0 element in the primitive list of $T_0^1$.

S12, Skipping to perform Steps S10~S12 until all the starting screen tile pairs in the starting screen tile pair subsets corresponding to the current polar line are accessed.

In Step S12, taking the first polar line in the horizontal direction as an example, the starting screen tile pair subset belonging to the polar line includes a screen tile pair $(T_{10}^0, T_0^1)$ and a screen tile pair $(T_{30}^0, T_{20}^1)$, that is, when starting with the screen tile pair $(T_{10}^0, T_0^1)$, and traversing all the not accessed screen tile pair according to the depth-first manner, the access loop ends. So far, the two spatially consistent surfaces starting with the screen tile pair $(T_{10}^0, T_0^1)$ and the screen tile pair $(T_{30}^0, T_{20}^1)$ have been rasterized and drawn.

Finally, rasterization and rendering of all screen block pairs is implemented according to S10~S12.

The above description is one optimum embodiment of the present invention only, the scope of protection for the present invention is not limited to the above embodiment, all technical solutions that belong to the principle of the present invention fall within the scope of protection of the present invention. To a person of ordinary skill in this field in the industry, any improvement or perfection conducted under the principle of the invention shall also be deemed as falling within the scope of protection of the present invention.

The invention claimed is:

1. A screen tile-pair based binocular rendering pipeline process and method, comprising the following steps:
   (1) dividing an entire space into a plurality of screen tile pairs according to the spatial relationship of left and right visual angles in binocular drawing, and generating a primitive list in the input scene corresponding thereto for each screen tile pair;
   (2) after generating the screen tile pairs, obtaining a plurality of spatially consistent surfaces by searching the screen tile pairs, wherein the spatially consistent surface is a surface formed by spaces corresponding to a plurality of connected screen tile pairs; and
   (3) after obtaining a plurality of spatial consistency surfaces, scheduling all the screen tile pairs, and simultaneously rasterizing ang drawing the primitives corresponding to each screen tile pair;
   wherein, the specific steps of Step (1) are as follows:
   (1-1) according to a present screen tile size n×n, dividing the screens corresponding to left and right visual angles, respectively, into a plurality of screen tiles $T_j^0$ and $T_j^1$; wherein, j=1,2, . . . , N represents the serial number of the screen tiles, and the serial number j is incremented from left to right, from top to small, N is the total number of the screen tiles, 0 represent left in $T_j^0$ and 1 represent right in $T_j^1$;
   (1-2) respectively calculating positions $L_{P_i}^0$ and $L_{P_i}^1$ of an input i-th primitive $P_i$ projected on the screens corresponding to left and right visual angles, wherein i=1, 2, M, M is the total number of the input primitives, and 0 represent left in $L_{P_i}^0$ and 1 represent right in $L_{P_i}^1$;
   (1-3) after the positions $L_{P_i}^0$ and $L_{P_i}^1$ are determined, respectively calculating screen tiles covered by the positions $L_{P_i}^0$ and $L_{P_i}^1$, and the screen tiles form screen tile set $T_{P_i}^0$, and $T_{P_i}^1$ covered by the primitive $P_i$;
   (1-4) in a screen tile unit, according to each polar line in the horizontal direction, simultaneously traversing from left to right the screen tiles on the current polar line in the screens corresponding to left and right visual angles, and determining whether the current primitive $P_{cur}$ belongs to the currently traversed screen tile pair $(T_{cur}^0, T_{cur}^1)$;
   (1-5) constructing a double-layer index in the traversing process, wherein the first layer index is a primitive index, which is a primitive list on the space corresponding to the screen tiles; the second layer index is an index of the primitives on the screen tiles, which is an index list of primitives on the screen tiles corresponding to the corresponding space of the screen tile pairs.

2. The screen tile-pair based binocular rendering pipeline process and method according to claim 1, wherein, in Step (1-4), the specific steps of whether the current primitive $P_{cur}$ belongs to the currently traversed screen tile pair $(T_{cur}^0, T_{cur}^1)$ are as follows:

(a) forming sets of $T_{Pcur}^0$, and $T_{Pcur}^1$ through respectively extracting the screen tiles on the current polar line from overlay screen tile sets $T_{Pcur}^0$ and $T_{Pcur}^1$ of the current primitive $P_{cur}$;
   and using the smallest sequence number screen tiles $T_{j_{min}}^0$ and $T_{j_{min}}^0$ extracted from the sets of $T_{Pcur}^0$, and $T_{Pcur}^1$ as the currently traversing screen tiles $T_{cur}^0, T_{cur}^1$;
   (b) respectively calculating the barycentric coordinates $(S_{cur}^0, e_{cur}^0)$ and $(S_{cur}^1, e_{cur}^1)$ of the screen tiles $T_{cur}^0$ and $T_{cur}^1$ on the boundary of the screen tiles, $S_{cur}^0$ and $e_{cur}^0$ respectively represent the barycentric coordinates calculated at the vertical coordinate $c_v^0$ on the left and right boundary of $T_{cur}^0$; $S_{cur}^1$ and $e_{cur}^1$ respectively represent the barycentric coordinates calculated at the ertical coordinate $c_v^1$ on the left and right boundary of $T_{cur}^0$ and $c_v^1 = c_v^0$;
   (c) determining the traversing direction d of the current primitive $P_{cur}$ on the current pole line by calculating the difference between the barycentric coordinates of the screen tile boundary on the same polar line;
   (d) respectively calculating the benefit interval $[E^0(s), E^0(e)]$, $[E^1(s), E^1(e)]$ of the screen tiles $T_{cur}^0, T_{cur}^1$, $[E^0(s), E^0(e)]$ and $[E^1(s), E^1(e)]$ have overlapping parts, then the current primitive $P_c$, belongs to the currently traversed screen tile pair $(T_{cur}^0, T_{cur}^1)$;
   wherein, $E^0(s) = d*s_{cur}^0$, $E^0(e) = d*e_{cur}^0$, $E^1(s) = d*s_{cur}^1$, $E^1(e) = d*e_{cur}^1$;
   (e) comparing the sizes of $E^0(e)$ and $E^1(e)$:
   if $E^0(e) < E^1(e)$, then $T_{cur+1}^0$ is treated as $T_{cur}^0$, $T_{cur}^1$ remains unchanged;
   if $E^0(e) > E^1(e)$, then $T_{cur+1}^1$ is treated as $T_{cur}^1$, $T_{cur}^0$ remains unchanged;
   if $E^0(e) = E^1(e)$, then $T_{cur+1}$ is treated as $T_{cur}^0$, $T_{cur+1}$ is treated as $T_{cur}^1$;
   (f) after performing Step (e), determining whether the screen tile $T_{cur}^0$ exists in the screen tile set $T_{Pcur}^0$ and the screen tile $T_{cur}^1$ exists in the screen tile set $T_{Pcur}^1$; if so, Step (b)~Step (f) are performed circularly, and if not, the traversal search for the current primitive $P_{cur}$ is ended.

3. The screen tile-pair based binocular rendering pipeline process and method according to claim 1, wherein, in Step (2), a plurality of spatially consistent surfaces obtained by searching the screen tile pairs are based on the screen tiles, the following steps are performed for each polar line in the horizontal direction:
   (2-1) among the screen tile pairs generated on the current polar line, using a screen tile pair that is not accessed as an starting screen tile pair $(T_s^0, T_s^1)$ to perform a traversing operation;
   (2-2) in the traversing operation, traversing neighboring screen tile pairs that have not been accessed in a depth-first manner;
   (2-3) if all connected screen tile pairs have been accessed, recording the starting screen tile pair $(T_s^0, T_s^1)$, and forming a spatially consistent surface by all connected screen tile pairs;
   (2-4) skipping to perform Steps (2-1)~(2-3) until all the screen tile pairs have been accessed on the current polar line;
   by traversing all the screen tile pairs on all the polar lines of the screen through Steps (2-1)~(2-4), a plurality of spatial consistency surfaces are formed, and the starting screen tile pair $(T_s^0, T_s^1)$ in each spatial consistency surface is recorded, which constitutes a starting screen tile pair set, the starting screen tile pair set includes a plurality of starting screen tile pair subsets divided by polar lines, and each starting screen tile pair subset includes all starting screen tile pairs belonging to the same polar line.

4. The screen tile-pair based binocular rendering pipeline process and method according to claim 3, wherein, in Step (2-1), in the screen tile pairs that are not accessed on the current polar line, the screen tile pair with the smallest screen tile number corresponding to the left visual angle is used as the starting screen tile pair $(T_s^0, T_s^1)$, if there are multiple screen tile pairs with the smallest screen tile number corresponding to the left visual angle, then the screen tile pair with the smallest screen tile number corresponding to the left and right visual angles are used as the starting screen tile pair $(T_s^0, T_s^1)$.

5. The screen tile-pair based binocular rendering pipeline process and method according to claim 3, in Step (2-2), for the screen tile pair $(T_s^0, T_s^1)$, the neighboring screen tile pairs that have not been accessed are traversed in a depth-first manner according to the screen tile pair $(T_{s+1}^0, T_{s+1}^1)$, the screen tile pair $(T_{s+1}^0, T_{s+1}^1)$, the screen tile pair $(T_s, T_{s+1}^1)$.

6. The screen tile-pair based binocular rendering pipeline process and method according to claim 3, in Step (3), the following steps are performed for each polar line in the horizontal direction:
- (3-1) among the screen tile pair subset corresponding to the current polar line, starting with the appropriate starting screen tile pair, according to the depth-first manner, all the unrasterized screen tile pairs in the spatially consistent surface corresponding to the starting screen tile pair are traversed;
- (3-2) during the traversing process, the primitives in the screen tile pairs being accessed are rasterized and drawn;
- (3-3) skipping to perform Steps (3-1)~(3-3) until all the starting screen tile pairs in the starting screen tile pair subsets corresponding to the current polar line are accessed;

all the screen tile pairs are rasterized and drawn according to Steps (3-1)~(3-3).

7. The screen tile-pair based binocular rendering pipeline process and method according to claim 6, wherein, in Step (3-1), the appropriate starting screen tile pair is determined in the following manner: in the screen tile pair subsets, the starting screen tile pair with the maximum screen tile number corresponding to the right visual angle is used as the appropriate starting screen tile pair; if there are multiple screen tile pairs with the maximum screen tile number corresponding to the right visual angle, then the screen tiles pair with the maximum screen tile number corresponding to the right and left visual angles are used as the appropriate starting screen tile pair.

8. The screen tile-pair based binocular rendering pipeline process and method according to claim 6, wherein, in Step (3-2), the specific process of rasterizing and drawing the primitives in the screen tile pairs being accessed:
- (3-2-1) for the current screen tile pair being accessed, two primitive indexes that need to be drawn are read according to the two-layer index;
- (3-2-2) the rasterization data and the corresponding required rendering data are read according to the two primitive indexes, and the two primitives are rasterized and drawn.

9. The screen tile-pair based binocular rendering pipeline process and method according to claim 8, wherein, in Step (3-2-1), it is necessary to determine whether the two primitive indexes corresponding to the screen tile pairs are negative, and if so, the two primitives have been rasterized on the associated screen tiles, if not, then Step (3-2-2) is performed; and after completing the rasterization and rendering in Step (3-2-2), the primitive index is assigned a negative value and written back to the position corresponding to the primitive list on the screen tile.

\* \* \* \* \*